US011489818B2

(12) United States Patent
Werner et al.

(10) Patent No.: US 11,489,818 B2
(45) Date of Patent: Nov. 1, 2022

(54) DYNAMICALLY REDACTING CONFIDENTIAL INFORMATION

(71) Applicant: International Business Machines Corporation, Armonk, NY (US)

(72) Inventors: John S. Werner, Fishkill, NY (US); Luke N. Buschmann, Kingston, NY (US); Bradley J. Hoover, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 16/365,371

(22) Filed: Mar. 26, 2019

(65) Prior Publication Data

US 2020/0314068 A1 Oct. 1, 2020

(51) Int. Cl.
*G06F 21/62* (2013.01)
*G06F 40/284* (2020.01)
*G06F 40/20* (2020.01)
*H04L 9/40* (2022.01)

(52) U.S. Cl.
CPC ......... *H04L 63/0421* (2013.01); *G06F 21/62* (2013.01); *G06F 21/6245* (2013.01); *G06F 40/20* (2020.01); *G06F 40/284* (2020.01); *H04L 63/0457* (2013.01); *H04L 63/0807* (2013.01)

(58) Field of Classification Search
CPC ............... G06F 40/20; G06F 40/205; G06F 40/279–289; G06F 40/30; G06F 21/62; G06F 21/6245; G06F 21/6254; H04L 63/0421; H04L 63/0457; H04L 63/0807
See application file for complete search history.

(56) References Cited

U.S. PATENT DOCUMENTS

| | | | |
|---|---|---|---|
| 7,756,843 B1 | 7/2010 | Palmer | |
| 8,181,036 B1 | 5/2012 | Nachenberg | |
| 8,561,127 B1 * | 10/2013 | Agrawal | H04L 63/105 726/13 |
| 8,688,601 B2 | 4/2014 | Jaiswal | |
| 9,614,670 B1 | 4/2017 | Ghetti et al. | |
| 9,715,528 B2 | 7/2017 | Ho et al. | |
| 9,779,252 B2 | 10/2017 | Sharma et al. | |
| 2006/0048224 A1 | 3/2006 | Duncan et al. | |
| 2006/0075228 A1 | 4/2006 | Black et al. | |
| 2009/0070881 A1 | 3/2009 | Yellepeddy et al. | |

(Continued)

FOREIGN PATENT DOCUMENTS

| | | |
|---|---|---|
| GB | 2559830 A | 8/2018 |
| WO | 2018035492 A1 | 2/2018 |

OTHER PUBLICATIONS

Great, "Global Data Leakage Survey 2006," Kaspersky Lab, Feb. 16, 2007, 11 pages, retrieved from https://securelist.com/global-data-leakage-survey-2006/36126/.
Prot-On, "Tips to prevent information leaks in your company 2015," Prot-On, May 4, 2015, 3 pages, retrieved from https://www.prot-on.com/tips-to-prevent-information-leaks-in-your-company.

(Continued)

*Primary Examiner* — Kevin Bechtel
*Assistant Examiner* — D'Arcy Winston Straub
(74) *Attorney, Agent, or Firm* — Zilka-Kotab, P.C.

(57) ABSTRACT

A computer-implemented method for creating a classified token database usable for dynamically redacting confidential information from communications includes performing natural language processing on training input and determining whether a confidentiality level is present in the training input. The method includes, in response to determining that the confidentiality level is present, adding at least one classified token associated with the training input to a classified token database.

20 Claims, 6 Drawing Sheets

(56) References Cited

U.S. PATENT DOCUMENTS

| | | | |
|---|---|---|---|
| 2010/0229246 A1 | 9/2010 | Warrington et al. | |
| 2011/0247081 A1 | 10/2011 | Shelton | |
| 2013/0346753 A1* | 12/2013 | Boysen | H04L 9/3263 |
| | | | 713/168 |
| 2015/0040237 A1* | 2/2015 | Vandervort | G06F 21/6254 |
| | | | 726/26 |
| 2016/0379139 A1 | 12/2016 | Eldar et al. | |
| 2017/0048275 A1* | 2/2017 | John | G06F 21/6245 |
| 2017/0147828 A1* | 5/2017 | Kurian | G06F 21/604 |
| 2018/0322106 A1* | 11/2018 | Roks | H04L 67/06 |
| 2018/0341785 A1* | 11/2018 | Barday | H04L 63/102 |
| 2019/0013038 A1* | 1/2019 | Thomson | G06F 40/20 |
| 2020/0042837 A1* | 2/2020 | Skinner | G06V 10/764 |

OTHER PUBLICATIONS

IBM, "Visual Recognition," IBM, 7 pages, retrieved on Feb. 11, 2019 from https://www.ibm.com/watson/services/visual-recognition/.

IBM, "Natural Language Understanding," IBM, 11 pages, retrieved on Feb. 11, 2019 from https://www.ibm.com/watson/services/natural-language-understanding/.

IBM, "Tone Analyzer," IBM, 9 pages, retrieved on Feb. 11, 2019 from https://www.ibm.com/watson/services/tone-analyzer/.

IBM, "Natural Launguage Classifier," IBM, 15 pages, retrieved on Feb. 11, 2019 from https://www.ibm.com/watson/services/natural-language-classifier/.

Harvard, "Information Security Policy; By Data Security Level," Harvard University, 5 pages, retrieved on Feb. 11, 2019 from https://policy.security.harvard.edu/view-data-security-level.

* cited by examiner

DYNAMICALLY REDACTING CONFIDENTIAL INFORMATION

BACKGROUND

The present invention relates to preventing leakage of confidential information, and more specifically, this invention relates to dynamically redacting confidential information.

Data leakage is a prevalent threat to corporate and/or governmental productivity and growth. Implications of data leakage may include legal liability, regulatory compliance requirements, lost productivity, tarnished business reputation, etc. Data can be intentionally or unintentionally leaked. The most common channels of information leakage include the use of mobile devices and/or the internet.

SUMMARY

A computer-implemented method for creating a classified token database usable for dynamically redacting confidential information from communications, according to one embodiment, includes performing natural language processing on training input and determining whether a confidentiality level is present in the training input. The method includes, in response to determining that the confidentiality level is present, adding at least one classified token associated with the training input to a classified token database.

A computer-implemented method for dynamically redacting confidential information from communications, according to one embodiment, includes receiving a communication and identifying tokens within the communication. The method includes comparing the identified tokens to classified tokens in a classified token database and determining whether any of the identified tokens match classified tokens in the classified token database and, in response to finding at least one identified token that matches a classified token in the classified token database, selecting a portion of the communication corresponding to the at least one identified token to redact. The method includes outputting an indication of the selected portion of the communication to enable redaction of the selected portion.

A computer program product for dynamically redacting confidential information from communications, according to one embodiment, includes a computer readable storage medium having program instructions embodied therewith. The program instructions are executable by a computer. The program instructions cause the computer to receive a classified token comparison for a communication and determine whether to perform a redaction on the communication based at least in part on the classified token comparison. The program instructions cause the computer to perform the redaction in response to determining that the redaction on the communication is to be performed.

Other aspects and embodiments of the present invention will become apparent from the following detailed description, which, when taken in conjunction with the drawings, illustrate by way of example the principles of the invention.

DETAILED DESCRIPTION

Figure 1:
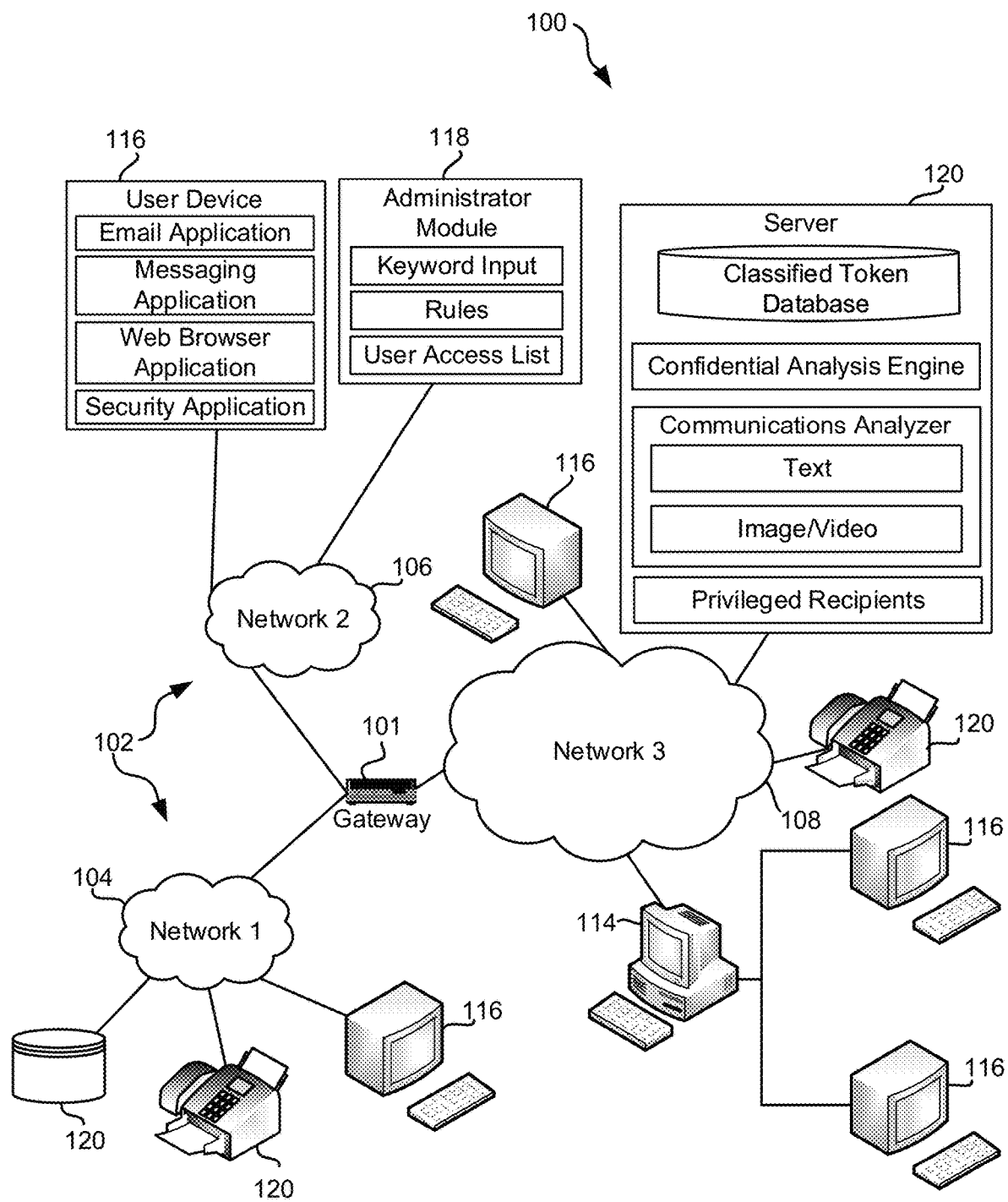
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for redacting confidential information.

In one general embodiment, a computer-implemented method for creating a classified token database usable for dynamically redacting confidential information from communications includes performing natural language processing on training input and determining whether a confidentiality level is present in the training input. The method includes, in response to determining that the confidentiality level is present, adding at least one classified token associated with the training input to a classified token database.

In another general embodiment, a computer-implemented method for dynamically redacting confidential information from communications includes receiving a communication and identifying tokens within the communication. The method includes comparing the identified tokens to classified tokens in a classified token database and determining whether any of the identified tokens match classified tokens in the classified token database and, in response to finding at least one identified token that matches a classified token in the classified token database, selecting a portion of the communication corresponding to the at least one identified token to redact. The method includes outputting an indication of the selected portion of the communication to enable redaction of the selected portion.

In another general embodiment, a computer program product for dynamically redacting confidential information from communications includes a computer readable storage medium having program instructions embodied therewith. The program instructions are executable by a computer. The program instructions cause the computer to receive a classified token comparison for a communication and determine whether to perform a redaction on the communication based at least in part on the classified token comparison. The program instructions cause the computer to perform the redaction in response to determining that the redaction on the communication is to be performed.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, mobile phone, tablet, or any other type of logic. It should be noted that a user device 116 may also be directly coupled to any of the networks, in one embodiment.

In one approach, a user device 116 may have thereon a plurality of applications such as email applications, messaging applications, web browser applications, etc. Exemplary applications may include Gmail, Apple Mail, Outlook, Yahoo Mail, Thunderbird, Windows Mail, iMessage, WhatsApp, WeChat, etc. Any of the foregoing applications may be considered communication mediums if the application is capable of transmitting and/or receiving communications.

In a preferred embodiment, the user device 116 includes a security application. In some approaches, cognitive processing and/or machine learning aspects of the security application preprocesses training input and/or communications as described in further detail below in reference to FIGS. 3-6. The security application may be a standalone application, a plugin, an applet, etc. as would be understood by one having ordinary skill in the art upon reading the present disclosure.

An administrator module 118 may select data to train a natural language processor and/or a machine learning system. In some approaches, the administrator module 118 may comprise a trained natural language processor and/or machine learning system which may be downloaded from an administrator site. Data selected by the administrator module 118 may comprise training input. Training input may include communications, labeled documents, non-disclosure agreements (NDAs), emails with various levels of confidentiality, classified tokens, text strings labeled with various levels of confidentiality, keyword inputs, etc. A communication may be an email, text message, audio data, image data, etc. A communication as referred to herein generally refers to a live, real-time communication, although it should be understood that training input may comprise historical communications. A classified token as referred to herein may be a tag and/or metadata associated with any text, string of text data, image data, audio data, etc. which has been marked as confidential and/or comprises a confidentiality level. In some approaches, the classified token is the particular text, string of text data, image data, audio data, etc. which is confidential.

In one embodiment, the administrator module 118 may comprise rules derived from the training input and/or communications. The rules may be classifications and/or privileges created by the user, by the administrator module, by the security application, etc. In one approach, the user may manually grant privileges to other users. A user may be privileged or non-privileged. In one approach, various classified tokens may not be redacted for privileged users and/or recipients. In another approach, various classified tokens may be redacted for non-privileged users and/or recipients.

In one approach, the user may manually define classifications. In another approach, the classifications may be downloaded from an administrator site. Classifications may be determined and/or assigned using any technique known in the art.

In one approach, the administrator module 118 may comprise a user access list. A user access list may include privileges and/or classifications stored in association with users. The privileges and/or classifications may be stored in the user access list in association with users in any form known in the art. In a preferred approach, privileges and/or classifications are stored in association with users in a table. Associations between privileges and/or classifications and one or more users may be derived from training input. For example, a list of privileged users who may access information associated with "Project A" may be derived from NDAs regarding "Project A." Users who are not on the list of privileged users are non-privileged users who may not access information associated with "Project A."

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

In one embodiment, the peripheral 120 is a server. The server may comprise a classified token database. A classified token database may include classified tokens derived from training input provided by the administrator module, communications, lists of privileged recipients derived from user access lists, etc.

In one approach, the server may comprise the administrator module 118. In other approaches, the administrator module 118 is separate from the server.

In one approach, the server contains a confidential analysis engine. A confidential analysis engine may use training from the administrator module, machine learning, natural language processing (NLP) and/or audio, visual, text analysis to analyze communications, build a classified token database, and/or update a classified token database. The confidential analysis engine may learn new classified tokens based on frequency of appearance in association with previously classified tokens. The confidential analysis engine may learn who a user interacts with.

The server may include a communications analyzer. The communications analyzer may be configured to perform at least some of the operations of the methods described in further detail below in FIGS. 3-6. The communications analyzer may receive a variety of inputs including training input, communications, requests from the user, rules, etc. The communications analyzer may tokenize (e.g., identify tokens within the communication) the communication and/or extract classified tokens, the context of the communication, the subject of the communication, etc. The communications analyzer may determine the method of communication, the recipients of the communication, the sender of the communication, etc.

The communications analyzer may perform a classified token comparison. A classified token comparison may compare any identified tokens within the communication to classified tokens from the classified token database. In response to determining at least one identified token matches a classified token from the classified token database, the communications analyzer may redact at least a portion of the communication for one or more of the recipients.

In some approaches, the communications analyzer selects a portion of the communication corresponding to the at least one identified token for redaction. In one approach, the communication analyzer may output an indication of the selected portion of the communication to enable a remote user device to perform a redaction based at least in part on the classified token comparison. An indication may include a warning to the user associated with the redaction, an option to the user including whether to perform the redaction, an option to the user to send the communication through a relatively more secure communication medium, etc. The indication may be an audiovisual output. The indication may be output in any form known in the art.

In a preferred embodiment, a remote user device refers to the device which generated the communication. A remote user device may be a device which is geographically remote from a server. A remote user device may be connected to a server via a network as would be understood by one of ordinary skill in the art.

In some approaches, the indication of the selected portion may be sent to a remote user device which generated the communication, output to another application on the same device which generated the communication, etc. In other approaches, the indication of the selected portion may be output and/or sent to any combination of devices and/or applications.

In one approach, the communications analyzer may use visual recognition techniques to perform various operations of the methods described in further detail below in FIGS. 3-6. Visual recognition techniques may include optical character recognition (OCR), Google Image Recognition, Amazon Rekognition, Clarifai, Ditto Labs, Brandwatch Image Insights, GumGum, LogoGrab, IBM Image Detection, or any visual recognition analysis software known in the art. In an exemplary embodiment, the visual recognition software to perform the visual recognition analysis is Watson Visual Recognition Application Programming Interface (API) (International Business Machines Corporation (IBM), 1 New Orchard Road, Armonk, N.Y. 10504, United States).

In one approach, the communications analyzer uses audio analysis techniques to perform various operations of the methods described in further detail below in FIGS. 3-6. Audio analysis may be performed using Audacity, Seewave, TuneR, Soundecology, Ineq, Pachyderm, Raven Pro, Avisoft SASLab Pro, Adobe Audition or any audio data analysis software known in the art. In an exemplary embodiment, the audio data analysis software to perform the audio data analysis is Watson Speech to Text API and Watson Natural Language Understanding (International Business Machines Corporation (IBM), 1 New Orchard Road, Armonk, N.Y. 10504, United States). Additional Watson APIs may be used to perform various operations of the methods described in further detail below in FIGS. 3-6. Any known technique in the art for analyzing audio data may be used.

In various embodiments, the communications analyzer may be configured to perform at least some of the operations of the methods described in further detail below (see FIGS. 3-6) in response to determining that the communication medium is unsecure. One or more classified tokens may be redacted if the communication is sent via a communication medium which is unsecure. An unsecure communication medium may include a text messaging application, a social media application, a personal email application, etc. One or more classified tokens may not be redacted if the communication is sent via a communication medium which is secure. A secure communication medium may be a secure company email account, a security application, a preauthorized application, etc.

In one approach, the communications analyzer may perform the redaction to send the communication through an unsecure communication medium. In one embodiment, if sending a communication is attempted via an unsecure communication medium, the communications analyzer may output an option to send the communication through a secure medium rather than sending the redacted communication via the unsecure medium.

For example, a user may attempt to send a communication comprising tokens identified as confidential classified tokens to a coworker through an unsecure communication medium. The communications analyzer may output an option to send the communication with redactions via the unsecure communication medium or to send the communication without redactions via a relatively more secure communication medium (e.g., an email application associated with work) if the recipient has appropriate privileges for the classified tokens, etc.

While FIG. 1 may show the user device 116, the administrator module 118, the server, and other various modules as separate entities, one having ordinary skill in the art would, upon reading the present disclosure, understand that one module and/or any combination of modules may comprise any of the various aspects of the various modules. For example, substantially all of the various aspects of the modules may operate on the user device 116. In another example, the server may comprise the various aspects of the administrator module 118 for processing data generated by the user device 116. In yet another example, a security application on the user device 116 may perform various operations of the methods described below.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
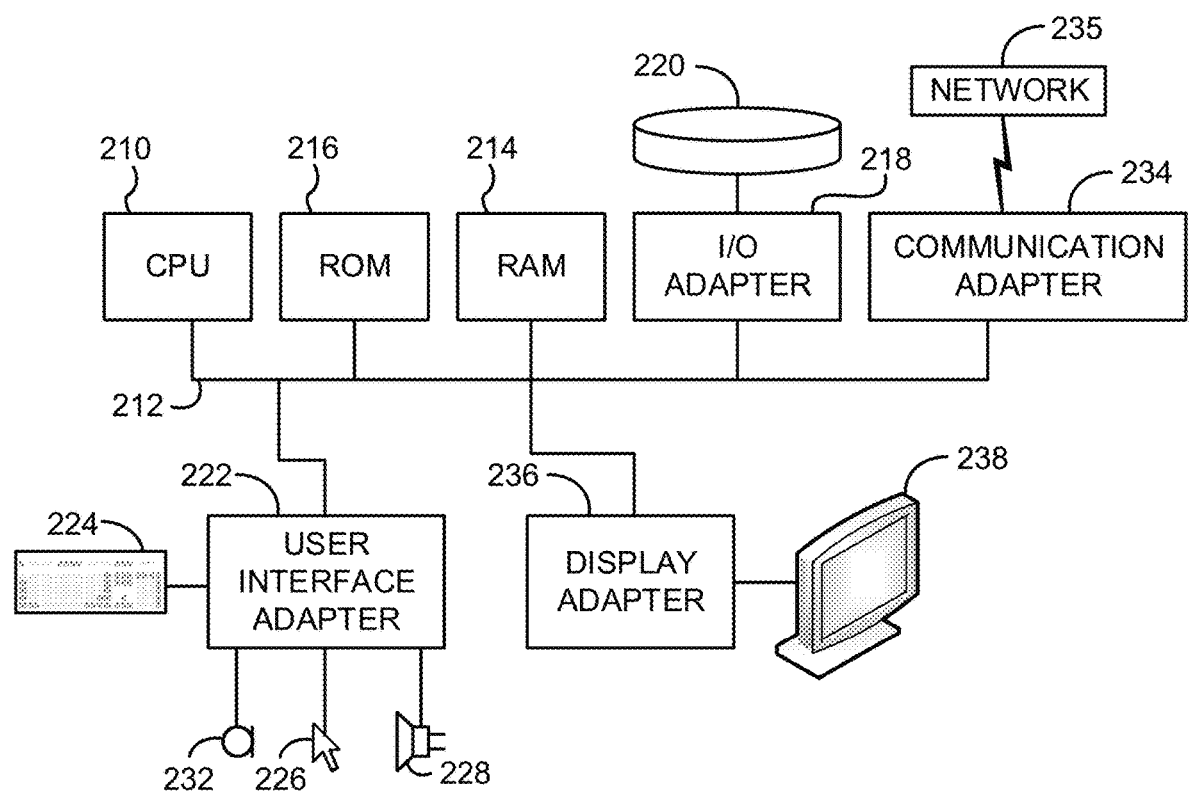
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

Data leakage is a threat to many different agencies, organizations, corporations, etc. Data leakage may comprise intentional leakages via malicious hackers, disgruntled current and/or former employees, etc. However, the majority of data leakages occur unintentionally due to employee negligence regarding lost or stolen company mobile devices, the use of the internet, not encrypting communications and/or data files, etc. Internal data leakage vectors include instant messaging, chat rooms, email, web logs, website inputs, social media, text messages, etc. There is a growth in use of online workplace communications mediums such as Slack, ZOOM, Mattermost, Zulip, Floock, Ryver, etc. in an effort to centralize communications and prevent data leakages.

Conventional technology-based mitigation against data leakage requires manual input, is often time-consuming to update, and/or is severely limited in application.

Some of the embodiments disclosed herein include approaches for dynamically redacting confidential information from a user's communication(s) when the user is using any communication medium. A communication medium may be secure or unsecure. A secure communication medium may comprise at least some security measures to prevent unauthorized access to confidential information. An unsecure communication medium may be configured such that unauthorized users are able to access confidential information with little effort. An unsecure communication medium may be undesirable for communicating confidential information.

Natural language processing and/or machine learning may be used to create and/or update a classified token database in real-time in order to classify user communications based on learned confidential information. In various approaches, the classified tokens may be associated with certain projects, business units, teams, etc. The classified token database may be used to dynamically redact learned confidential information from a user communication in real-time. At least some of the operations of the methods as disclosed herein provide an additional level of protection and/or limit data leaks associated with employee negligence.

Figure 3:
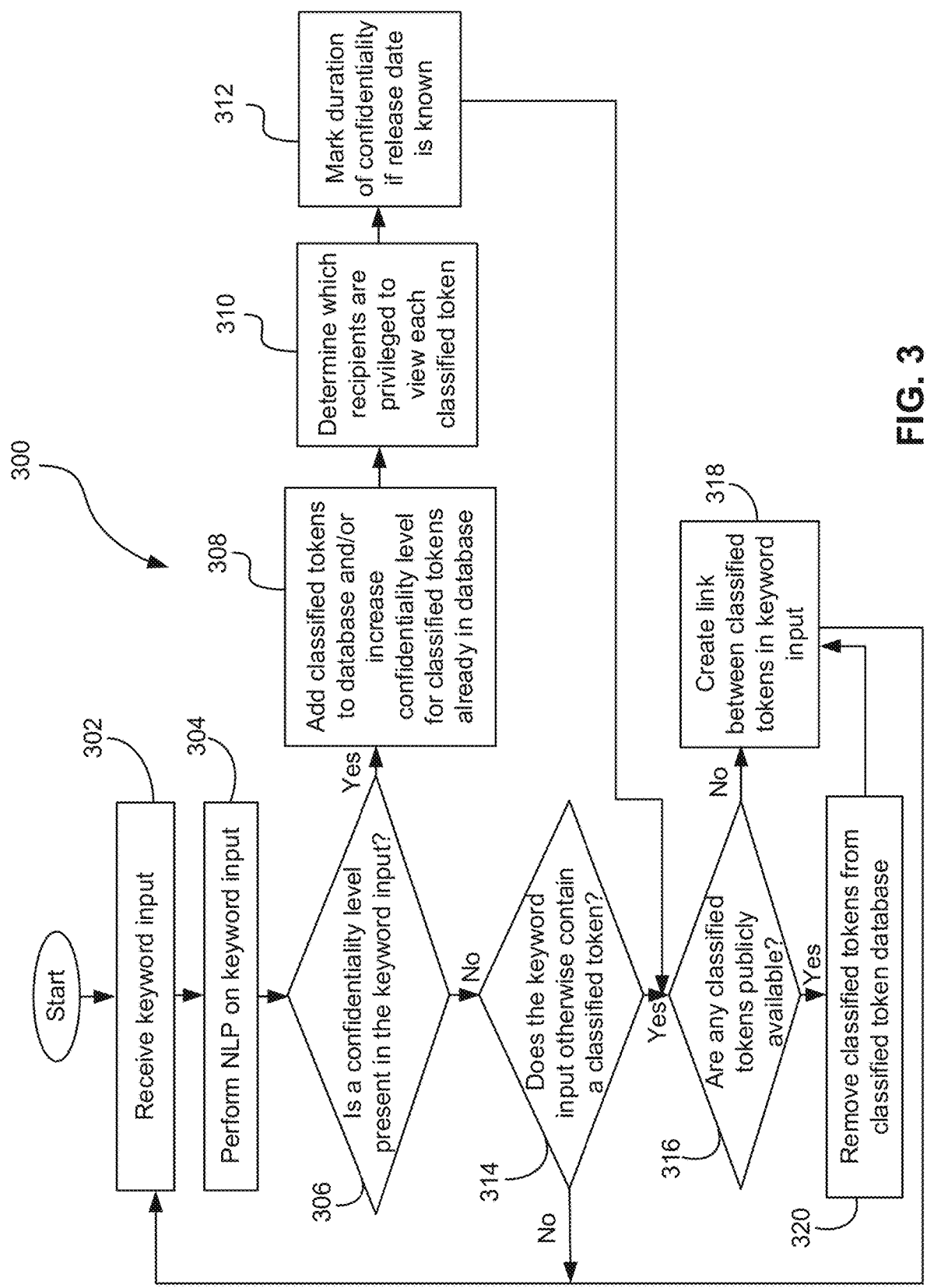
FIG. 3 is a flowchart of a method, according to one embodiment.

Now referring to FIG. 3, a flowchart of a method 300 is shown according to one embodiment. The method 300 may be performed in accordance with the present invention in any of the environments depicted in FIGS. 1-2 and 4-6, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 includes operation 302 which comprises receiving training input. Training input may be received in any manner known in the art. In some approaches, the training input is selected by an administrator module and received at a server for processing. In other approaches, the training input is generated by a user device and received at a server for processing. The training input may be generated and received by the same device. The training input may be generated and/or received by any combination of devices.

Training input may include labeled documents, non-disclosure agreements (NDAs), emails with various levels of confidentiality, classified tokens, text strings labeled with various levels of confidentiality, historical communications, etc. A classified token as referred to herein may be a tag and/or metadata associated with any text, string of text data, image data, audio data, etc. which has been classified as confidential. In a preferred approach, a classified token is the specific text, string of text data, image data, audio data, etc. which is confidential.

Operation 304 includes performing natural language processing on the training input. Any known technique may be used to perform natural language processing including Google Natural Language, Natural Language Toolkit, Apache Lucene and Soir, Apache OpenNLP, CoreNLP, SpaCy, etc. In a preferred embodiment, the natural language processing is performed using Watson Natural Language Understanding, Watson Tone Analyzer, and/or Watson Natural Language Classifier.

In one embodiment, the natural language processing parses the training input into confidentiality levels and/or classified tokens. In one approach, the confidentiality level corresponds to particular text data, audio data, visual data, etc. within the training input and/or the recipients of the communication.

In other approaches, operation 304 includes performing visual and/or audio analysis according to any of the techniques described above in reference to FIG. 1 to parse the training input into confidentiality levels and/or classified tokens.

Decision block 306 includes an operation to determine whether a confidentiality level is present in and/or associated with some or all of the training input. The operation may include determining whether at least a portion of the training input is marked as confidential, e.g., by being labeled as "confidential" in a document header, etc. In one embodiment, various techniques described above determine that the training input is marked as confidential by identifying the terms "confidential," "for internal use," "private," "classified," "secret," or any variation thereof. A marking as confidential may include a confidentiality level. In one approach, some or all of the training input may be marked as confidential.

A confidentiality level may be assigned according to standardized confidentiality systems. For example, in one conventional system, the data security levels 1-5 are assigned accordingly: level 1 corresponds to public information and/or directory information, level 2 corresponds to confidential information that, if disclosed, would not cause material harm, level 3 corresponds to confidential information which carries a risk of material harm (e.g., legal liability, damage to reputation), level 4 corresponds to confidential information which carries a risk of serious harm (e.g., individually identifiable information which if disclosed would likely cause serious social, psychological, reputational, financial, legal or other harm to an individual or group), level 5 corresponds to confidential information which carries a risk of severe harm (e.g., individually identifiable information which if disclosed would create risk of criminal liability, loss of insurability or employability, or severe social, psychological, reputational, financial or other harm to an individual or group). In other approaches, the confidentiality levels are assigned and/or created by individual users, organizations, corporations, the security application, etc.

Operation 308 includes, in response to determining that the confidentiality level is present, adding at least one classified token to a classified token database. Operation 308 may include adding more than one classified token to a classified token database and/or increasing the confidentiality level for classified tokens already in the database. In one approach, classified tokens may be the specific text data, audio data, visual data, etc. within the training input which are marked as confidential (e.g., with a confidentiality level). Classified tokens may be deemed confidential based on prior learning from previous training inputs. Classified tokens may be deemed confidential based on repeated association with previously marked classified tokens. For example, a first classified token in the training input may be deemed confidential in response to repeated association with a second classified token in the training input which is marked as confidential.

In response to determining that at least a portion of the training input is not marked as confidential, the method may proceed to decision block 314 to determine whether a known classified token exists within the training input. In some approaches, the method 300 eliminates pronouns and determines whether any nouns and/or technical terms contain any associated classified tokens. An illustrative example is described in reference to FIG. 6. The cognitive method may identify certain classified tokens which have a high probability of being marked as confidential. A high probability may be determined based at least in part on association with previously marked classified tokens and/or confidentiality levels. In some approaches, the method 300 may assign identified tokens a threshold probability of being marked as confidential. A probability may be measured on a scale from 0 to 1 where 0 indicates that the identified token is unlikely to be marked as confidential and 1 indicates that the identified token is substantially certain to be marked as confidential. In a preferred approach, the threshold probability for marking an identified token as confidential may be more than approximately 0.40. If no portion of the training input is marked as confidential and no known classified token exists within the training input, the method 300 reiterates for each new set of training input.

Operation 310 determines which recipients are privileged to view each classified token which was added and/or updated to the classified token database. Recipients and/or privileges may be determined by confidentiality levels (e.g., confidentiality levels 1 through 5) based on business units, departments, projects, job titles, management levels, etc. Recipients and/or privileges may be determined cognitively based on past training inputs, communications, linkages between classified tokens, shared projects, shared teams, shared departments, shared companies, shared recipients, etc.

In a preferred embodiment, classified tokens are associated with particular projects, business units, departments, teams, job titles, management levels, etc. For example, the classified token "Server ABC" may be a classified token which is redacted for Team A but not redacted for Team B which is working on "Server ABC" as disclosed in the "Server ABC" NDA.

Operation 312 determines whether the classified token is associated with a duration. A duration may be a date, a time period, a series of dates, etc. For example, a project may have one or more release dates in which some or all of the classified tokens related to a project may no longer be considered confidential and redaction of the classified tokens is unnecessary. A duration and/or date derived from a duration may be stored in association with the classified token in the classified token database in any form known in the art.

Decision block 316 includes an operation to determine whether the classified token is publicly available. The operation may include comparing the classified token to publicly released documentation to determine whether the classified token is publicly available based on the duration. In this operation, publicly released documentation may be analyzed to determine whether the publicly released documentation contains any classified tokens associated with a duration. Publicly released documentation may comprise press releases, web content, social media content, content generated and/or published by news outlets, articles, videos, etc. In a preferred approach, the publicly released documentation originates from a source which publishes and/or produces content discussing products and/or services relating to the industry of the business and/or product.

In one approach, classified tokens may be checked against publicly released documentation to determine whether the classified tokens have been publicly released and/or whether the release dates have changed for the one or more classified tokens. Classified tokens may be checked against publicly released documentation continuously, sporadically, periodically based on a time period set by the user, the security application, the organization, etc.

In a preferred approach, the publicly released documentation originates from a reputable source. For example, a classified token may not actually be released if the classified token is mentioned abstractly in a speculative social media post.

In some approaches, the cognitive method may learn from past similar training input which classified tokens were eventually released (e.g., no longer confidential) and which classified tokens remained confidential. For example, the cognitive method may see a similar product where the name and function classified tokens of the product were released but the software code classified token was never made public. The method may infer that a similar project's name and function classified tokens will be released but not the software code classified token.

In response to determining that no publicly available classified tokens are present, operation 318 may include creating a link between classified tokens in the training input. A linkage between classified tokens may imply that a classified token should be redacted if the classified token is linked to other classified tokens. In one approach, a linkage indicates that a first classified token and a second classified token are indicative of a characteristic including a shared project, a shared team, a shared company, a shared recipient, a shared confidentiality level, a shared duration, etc.

In some approaches, operation 318 includes creating a linkage between a first classified token within the training input and a second classified token within the training input. The linkage may be indicative of a shared project, a shared team, a shared company, a shared recipient, a shared duration, etc. It should be understood that classified tokens may have more than one meaning as determined by the operating system in order to prevent unnecessary redactions.

In one approach, if levels of confidentiality are provided (e.g., levels 1 to 5 with 1 being the lowest level and 5 being the highest level), the confidentiality level for an already classified token may be marked with the higher level in response to association with a classified token with a higher confidentiality level. For example, a first document contains the classified token "Project X" which is marked with a confidentiality level 1. A second document contains the classified token "Server ABC" which is marked with a confidentiality level 3. If the second document also mentions the classified token "Project X," the confidentiality level for "Project X" may be upgraded to level 3.

In response to determining that publicly available classified tokens are present, the method 300 proceeds to operation 320. Operation 320 may remove previously marked classified tokens from the classified token database. The method 300 may infer that a classified token is no longer confidential if the classified token appears in publicly released documentation. Once a classified token is removed from the classified token database, the classified token may not be redacted in future communications and/or training input.

In some approaches, operation 320 may proceed to operation 318 to create a link between classified tokens in the training input as described above.

The method 300 may loop back to operation 302 and reiterate for each set of training input. Various embodiments of the method 300 comprise creating and/or updating the classified token database for redacting classified tokens according to various operations of method 400 and/or method 500, discussed in further detail below.

Figure 4:
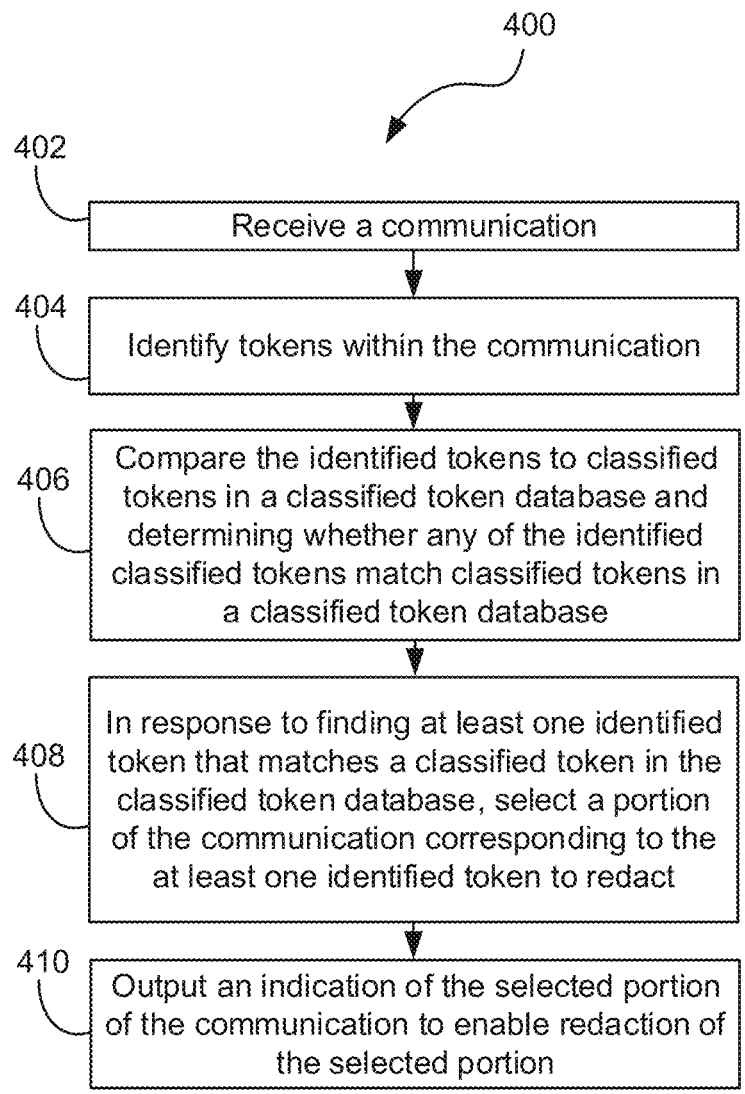
FIG. 4 is a flowchart of a method, according to one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402, which includes receiving a communication. In a preferred embodiment, the communication is received at the server (e.g., see 120 of FIG. 1). In one approach, the communication may be received from a remote user device which generated the communication. The user device may be any of the type described above. In yet another approach, the communication may be received at another application on the same device which generated the communication. In other approaches, the communication may be received at the remote user device which generated the communication where the user device has the components of a server (e.g., see 120 of FIG. 1).

In preferred approaches, the communication is not received by a third-party server which hosts an unsecure communication medium in operation 402. The communication is preferably not received by a user device which did not generate the communication in operation 402. One or more classified tokens should be identified and/or redacted according to various operations of method 300 and/or 400 before the communication is sent in order to prevent confidential information from residing on a server associated with an unsecure communication medium (e.g., a server associated with Apple, Google, Facebook, etc.).

A communication may be an email, text message, audio data, image data, etc. A communication as referred to herein generally refers to a live, real-time communication, although it should be understood a communication may comprise previously generated communications. The communication may be received using any technique known in the art.

In one approach, a list of recipients may be received with the communication. In another approach, the identity of the communication medium used to generate the communication may be received with the communication.

In yet another approach, the received communication may be encrypted. The communication may be encrypted using the Advanced Encryption Standard (AES), the Triple Data Encryption Standard (3DES), Twofish, Blowfish, the RSA (Rivest, Shamir, Adelman) technique, or any technique known in the art.

Operation 404 comprises identifying tokens within the communication. A token as referred to herein may be a tag and/or metadata associated with any text, a string of text data, image data, audio data, etc. In a preferred approach, a token is the specific text, string of text data, image data, audio data, etc. Tokens may be associated with certain projects, business units, teams, etc.

Operation 406 comprises comparing the identified tokens to classified tokens in a classified token database to determine whether any of the identified tokens match classified tokens in a classified token database. A classified token as referred to herein may be a tag and/or metadata associated with any text, a string of text data, image data, audio data, etc. which has been classified as confidential. In a preferred approach, a classified token is the specific text, string of text data, image data, audio data, etc. which is confidential. Classified tokens may be associated with certain projects, business units, teams, etc. Classified tokens may be identified using any of the techniques as described above with reference to FIGS. 1 and 3.

Operation 406 may comprise using natural language processing, machine learning, visual recognition, and/or audio analysis techniques to compare the identified tokens to classified tokens in a classified token database.

The classified token database may be created and/or updated according to the various embodiments of method 300. The classified token database may be pre-made locally on the device, downloadable from a cloud-based service, etc.

In one approach, at least some of the classified tokens in the classified token database are indicative of a non-privileged recipient. A non-privileged recipient may not access various communications corresponding to confidential information. A classified token which is indicative of a non-privileged recipient may include a name of a non-privileged recipient, a title of a non-privileged recipient, a company of a non-privileged recipient, etc.

In another approach, at least some of the classified tokens in the classified token database are indicative of a communication medium which is not secure. A classified token which is indicative of a communication medium which is not secure may include a name of communication medium, a server which hosts a communication medium which is not secure, etc.

In yet another approach, at least some of the classified tokens in the classified token database are indicative of information which is not publicly available. A classified token which is indicative of information which is not publicly available may include a product name, a product release date, design documentation, intellectual property documentation, etc.

In one approach, operation 406 generates classified token comparison data. Classified token comparison data may comprise the original communication, classified tokens, any metadata associated with the identified classified tokens such as corresponding confidentiality levels, the identity of the communication medium used to generate the communication, information from the database regarding the recipients (e.g., company, position, access level, privileged, non-privileged, etc.), linked classified tokens, etc.

Operation 408 comprises, in response to finding at least one identified token that matches a classified token in a classified token database, selecting a portion of the communication corresponding to the at least one identified classified token to redact. In one approach, operation 408 may select the identified classified token, the full sentence containing the at least one identified classified token, the full paragraph containing the at least one identified classified token, the entire communication containing the at least one identified classified token, an entire attachment containing the at least one identified classified token, etc. In another approach, operation 408 may select an entire attachment for certain recipients to redact if partial redaction is not possible.

Operation 410 comprises outputting an indication of the selected portion of the communication to enable redaction of the selected portion. An indication may include a warning to the user associated with the redaction, an option to the user including whether to perform the redaction, an option to the user to send the communication through a relatively more secure communication medium, the token comparison data, etc. The indication may be an audiovisual output. The indication may be output in any form known in the art.

In one approach, the indication of the selected portion of the communication may be output to a remote user device which generated the communication, the same device which received the communication, another application, a server, an administrator module, etc. using any technique known in the art. In one approach, the indication of the selected portion may be output to enable redaction of the selected portion. In another approach, the indication of the selected portion may be sent to a remote user device to enable the user device to redact the selected portion.

In one approach, operation 410 may comprise sending a recommendation to send the communication using a particular communication medium with the indication of the selected portion. Communication mediums may be secure or unsecure. Unsecure communication mediums may include personal emails, text messages, social media posts, etc. Operation 410 may comprise sending a recommendation to send the communication using a different communication medium which is relatively more secure than the communication medium with which the communication is to be sent.

Figure 5:
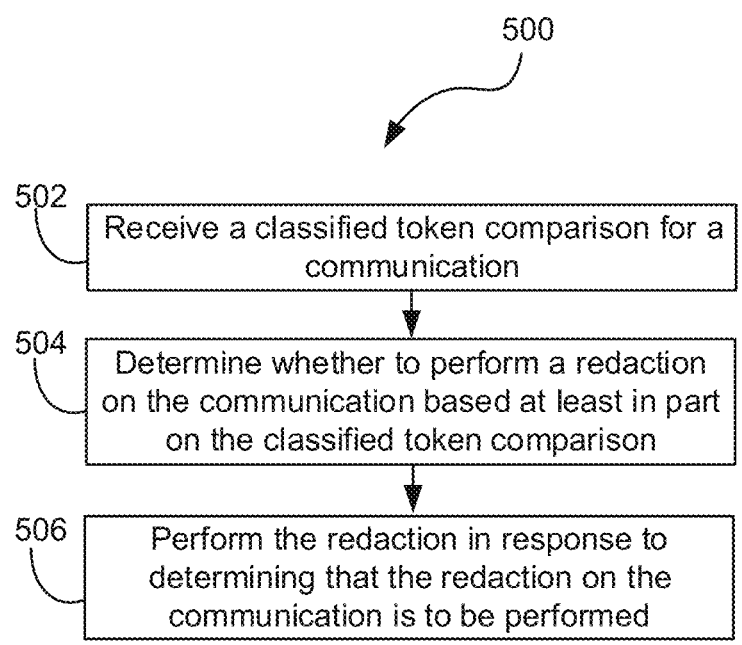
FIG. 5 is a flowchart of a method, according to one embodiment.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502, which includes receiving a classified token comparison for a communication. The classified token comparison may be generated according to various embodiments of method 300 and/or method 400 as described above. In one approach, the classified token comparison may be received by a remote user device, the same device which generated the communication and/or the classified token comparison, another application, a server, an administrator module, etc.

Operation 504 comprises determining whether to perform a redaction on the communication based at least in part on the classified token comparison. Operation 504 may comprise determining a portion of the communication to be redacted. The redaction may include the classified token, the full sentence containing any identified classified tokens, the full paragraph containing any identified classified tokens, the entire communication containing any identified classified tokens, an entire attachment containing any identified classified tokens, etc. In another approach, operation 504 may determine an entire attachment for certain recipients may be redacted if partial redaction is not possible.

Operation 506 may include performing the redaction in response to determining that the redaction on the communication is to be performed. The determination of whether to perform the redaction on the communication may be based at least in part on factors including whether a communication medium by which the communication is to be sent is not secure, whether a recipient is not a privileged recipient, whether the communication contains a predetermined threshold number of classified tokens, whether a recommended communication medium exists which is more secure, etc.

The determination of whether to perform the redaction on the communication may be based at least in part on whether a communication medium by which the communication is to be sent is not secure. Communication mediums may be secure or unsecure. Unsecure communication mediums may include personal emails, text messages, social media posts, etc. For example, the redaction may be performed because the communication contains one or more classified tokens and the communication was generated in a social media application which is unsecure.

The determination of whether to perform the redaction on the communication may be based at least in part on whether one or more of the recipients is not a privileged recipient. In some approaches, if a recipient is not stored in the database, the method 500 may not send the communication, send the communication with all possible redactions, and/or send an alert to the user and/or the intended recipient(s) of the communication. For example, the method 500 may infer that the recipient is not an appropriate recipient if the communication contains a classified token and the recipient is unknown.

In some embodiments, a communication intended for multiple recipients may be redacted for at least some of the recipients. In one approach, a redaction may be applied to the communication for at least a portion of the communication for at least one recipient where a communication is intended for more than one recipient.

For example, a communication may be intended for two recipients. One recipient is an employee of the same company as the sender. The other recipient is not an employee of the same company as the sender or is an employee of the same company but is in a different department than the sender. The first recipient may receive the original communication without any redactions. The second recipient may receive a redacted version of the communication. In various approaches, the user and/or the second recipient may receive an alert indicating that one or more redactions was performed on the communication as discussed in further detail below.

Method 500 may include sending the communication with the redaction in response to determining that the redaction on the communication is to be performed. In one approach, method 500 may include sending the communication without a redaction if the entire communication is safe to send to one or more recipients, the communication is safe to send to one or more recipients with one or more redactions, the communication is safe to send using the chosen communication medium, etc. Method 500 may include sending the original communication, the communication with all the redactions, the communication with at least some of the redactions, etc.

In another approach, method 500 includes sending the communication using a particular communication medium. The particular communication medium may be a recommended communication medium, a communication medium which is relatively more secure, a communication medium for sending the communication with relatively less redactions, etc.

In one approach, method 500 may include not sending the communication in response to a determination that the communication comprises a predetermined threshold number of classified tokens. In one embodiment, performing the redaction may comprise not sending the communication in response to a determination that the communication comprises a predetermined threshold number of classified tokens. In some approaches, a communication may not be sent if the content comprises a predetermined threshold number of classified tokens, a predetermined threshold percentage of the communication contains classified tokens, a predetermined threshold number of recipients which require redactions (e.g., non-privileged recipients), a number of recipients which require a threshold number of redactions, etc. Any of the aforementioned thresholds may be set by the user, the security application, the user device, default settings, etc. The communication may not be sent if the whole communication is a classified token, if a substantial portion of the communication contains classified tokens, if the classified tokens are associated with high confidentiality levels, etc.

In another approach, the communication may not be sent to one or more of the recipients based on one or more of the recipient's lack of privileges. In some approaches, if a recipient is not stored in the database, the method 500 may not send the communication, send the communication with all possible redactions, and/or send an alert to the user and/or the intended recipient(s) of the communication. For example, the method 500 may infer that the recipient is not an appropriate recipient if the communication contains a classified token and the recipient is unknown.

Method 500 may comprise, in response to performing the redaction in response to determining that the redaction on the communication is to be performed, sending an alert to a user and/or at least one recipient of the communication. In one approach, the alert may be sent only to the user instead of, or, in addition to, sending the communication. The alert may be sent to notify the user that one or more redactions were made, to suggest a particular application to generate the communication, to suggest a particular communication medium to send the communication, to suggest a particular recipient for the communication, etc. In another approach, an alert is sent only to the recipient. The alert may notify the recipient that one or more redactions were made, that a communication was attempted, etc. In yet another approach, an alert may be sent to both the user and the intended recipient(s).

In one approach, the user (e.g., the communication generator) and/or at least one recipient may receive an alert indicating that one or more redactions were performed on the communication. An alert may be sent to the user indicating at least one redaction should be performed. In response to receiving an alert indicating at least one redaction should be performed, the user may choose to send the communication with the redactions, modify the communication, choose a particular communication medium to send the communication, not send the communication, etc.

Various operations of the foregoing method include using the classified token database of learned confidential classified tokens and/or their associations, to dynamically redact the classified tokens if the classified tokens are input into an unsecure communication medium. The cognitively created and/or updated classified token database reduces risk of data leakages.

Figure 6:
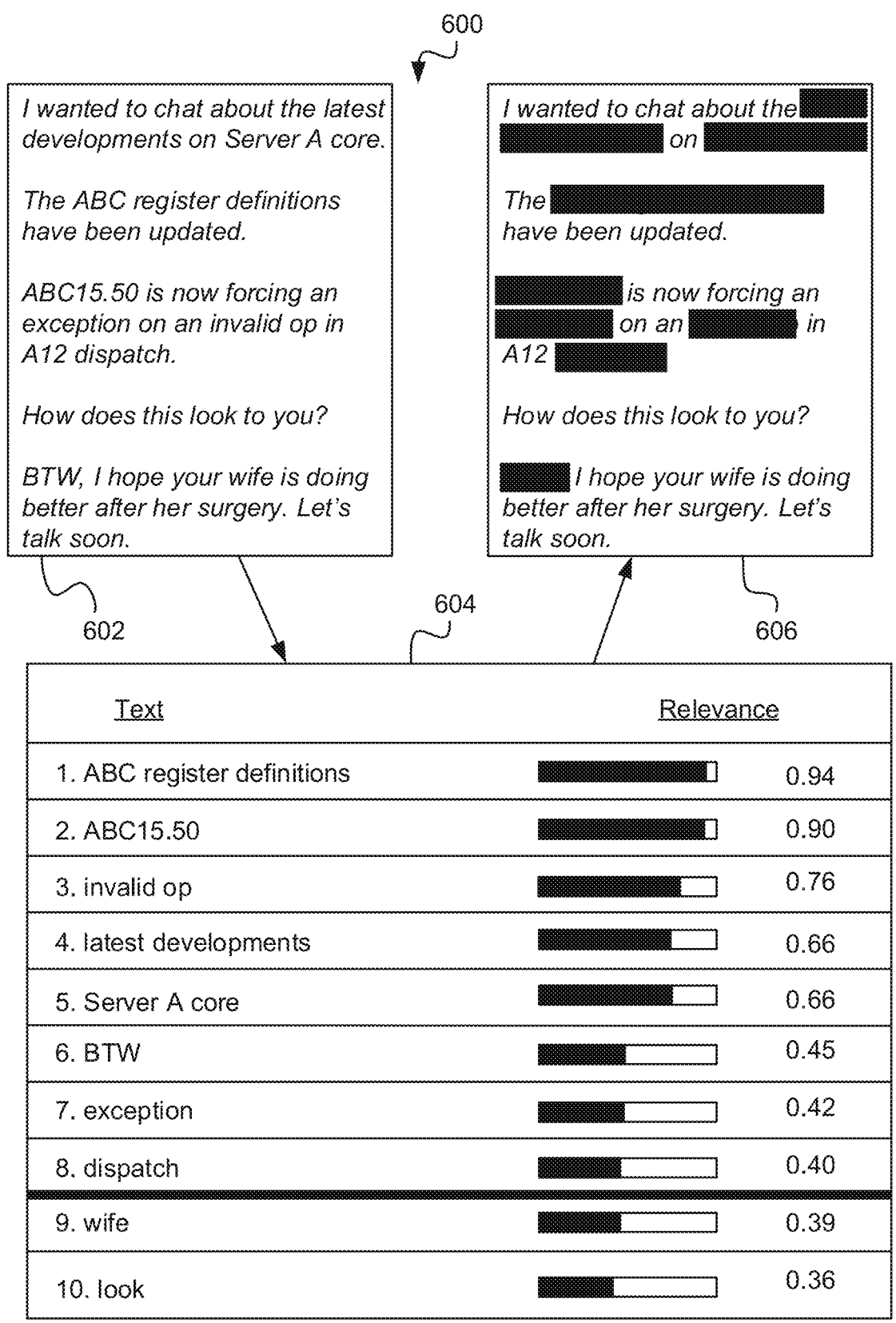
FIG. 6 is an exemplary output of the foregoing methods, according to one embodiment.

Now referring to FIG. 6, an exemplary output 600 of the foregoing methods is shown according to one embodiment. As an option, the exemplary output 600 may be implemented in conjunction with features from any other embodiments listed herein, such as those described with reference to FIGS. 1-5. Of course, however, such an exemplary output 600 and others presented herein may be used in various applications and/or permutations which may or may not be specifically described in the illustrative embodiments listed herein. Further, the exemplary output 600 presented herein may be used in any desired environment.

As shown, the exemplary output 600 includes an exemplary communication 602, an exemplary table of identified tokens 604, and an exemplary communication with redactions 606. While one specific implementation of the exemplary output 600 is shown in FIG. 6, it should be noted that the embodiments described herein may be implemented in the context of any of the embodiments of the present invention.

Exemplary communication 602 illustrates a communication subject to the various operations of method 300, method 400 and/or method 500. As depicted, the exemplary communication 602 may be an internal communication, sent to a privileged recipient, without any redactions.

The exemplary table 604 illustrates potential extracted classified tokens (e.g., potentially confidential terms) from the exemplary communication 602 as identified by some of the operations of method 300, method 400 and/or method 500. As shown, various potential classified tokens are marked with a threshold probability for marking a classified token as confidential. As described above, the threshold probability for marking a classified token as confidential may be more than approximately 0.40. In this example, potential tokens 1-8 meet the threshold probability and are marked as confidential (e.g., classified).

The classified tokens which meet the threshold probability are redacted from the exemplary communication 602. Exemplary communication 606 illustrates a communication subject to the various operations of method 300, method 400 and/or method 500. As depicted, the exemplary communication 606 may be a communication sent through an unsecure communication medium and/or a communication sent to a non-privileged recipient for at least some of the classified tokens.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for dynamically redacting confidential audio information from communications, the method comprising:
    receiving, by a communications analyzer, an encrypted audio communication and identification of an intended recipient of the audio communication from a security application;
    decrypting the encrypted audio communication;
    identifying, by the communications analyzer, tokens within the audio communication;
    comparing, by the communications analyzer, the identified tokens to classified tokens in a classified token database and determining whether any of the identified tokens match classified tokens in the classified token database, wherein the comparison includes using natural language processing and/or audio analysis to compare the identified tokens to the classified tokens in the classified token database;
    receiving, by the communications analyzer from the token database, a list of privileged recipients derived from a user access list of privileges and/or classifications associated with users;
    determining, by the communications analyzer, whether the intended recipient is on the list of privileged recipients;
    determining, by the communications analyzer, whether to perform a redaction on the audio communication based at least in part on the comparison and a determination that the intended recipient is not on the list of privileged recipients;
    in response to determining that the redaction on the audio communication is to be performed and in response to finding at least one identified token that matches a classified token in the classified token database, selecting, by the communications analyzer, a portion of the audio communication corresponding to the at least one identified token to redact, wherein the audio communication is intended for multiple recipients, wherein the redaction is to be performed for the recipient that is not on the list of privileged recipients; and
    outputting, by the communications analyzer, to the security application, an indication of the selected portion of the audio communication to enable redaction of the selected portion by a remote user device of a sender of the audio communication,
    wherein the indication also includes an option, to the sender of the audio communication, of whether to perform the redaction.

2. The computer-implemented method of claim 1, comprising sending the indication of the selected portion to a remote user device to enable the user device to redact the selected portion.

3. The computer-implemented method of claim 1, comprising sending a recommendation to send the unredacted audio communication to a second recipient that is on the list of privileged recipients using a particular communication medium which is relatively more secure than the communication medium with which the redacted audio communication is to be sent to the recipient that is not on the list of privileged recipients, wherein the relatively more secure communication medium is selected from the group consisting of: a secure company email account, a security application, and a preauthorized application.

4. The computer-implemented method of claim 1, wherein at least some information in the classified token database is indicative of a non-privileged recipient, wherein the at least some information is selected from the group consisting of: a name of a non-privileged recipient, a title of a non-privileged recipient, and a server which hosts a communication medium which is not secure.

5. The computer-implemented method of claim 1, wherein at least some information in the classified token database is indicative of a communication medium which is not secure, wherein the at least some information is selected from the group consisting of: a name of a communication medium and a server which hosts a communication medium which is not secure; wherein the communication medium which is not secure is selected from the group consisting of: a personal email account, a text message, and a social media application.

6. The computer-implemented method of claim 1, wherein at least some of the classified tokens in the classified token database are indicative of information which is not publicly available, wherein the information which is not publicly available is selected from the group consisting of: a product name, a product release date, design documentation, and intellectual property documentation.

7. The computer-implemented method of claim 1, wherein selecting the portion of the audio communication corresponding to the at least one identified classified token for redaction includes selecting a portion from the group consisting of: a full sentence containing the at least one identified classified token, a full paragraph containing the at least one identified classified token, an entire attachment containing the at least one identified classified token, and the entire audio communication containing the at least one identified classified token.

8. The computer-implemented method of claim 1, wherein at least some of the classified tokens are associated with a subject selected from the group consisting of: a project, a business unit, and a team.

9. The computer-implemented method of claim 1, wherein the determination of whether to perform the redaction on the audio communication is based at least in part on a factor selected from the group consisting of: whether a communication medium by which the audio communication is to be sent is not secure, and whether a recipient is not a privileged recipient.

10. The computer-implemented method of claim 1, in response to determining that the redaction on the audio communication is to be performed, send an alert to a user and/or at least one recipient of the audio communication.

11. The computer-implemented method of claim 1, wherein the audio communication is sent to more than one recipient and the redaction is applied to at least a portion of the audio communication to at least one recipient.

12. The computer-implemented method of claim 1, wherein the natural language processing parses the audio communication into confidentiality levels.

13. The computer-implemented method of claim 12, wherein the confidentiality levels correspond to at least some of the identified tokens in the audio communication.

14. The computer-implemented method of claim 12, wherein the confidentiality levels correspond to at least one recipient.

15. A computer program product for dynamically redacting confidential information from audio communications, the computer program product comprising a non-transitory computer readable storage medium having program instructions embodied therewith, the program instructions executable by a computer to cause the computer to:
receive an encrypted audio communication and identification of an intended recipient of the audio communication from a security application;
decrypt the encrypted audio communication;
identify tokens within the audio communication;
compare the identified tokens to classified tokens in a classified token database and determining whether any of the identified tokens match classified tokens in the classified token database, wherein the comparison includes using natural language processing to compare the identified tokens to the classified tokens in the classified token database;
determine, from the token database, a list of privileged recipients derived from a user access list of privileges and/or classifications associated with users;
determine whether the intended recipient is on the list of privileged recipients;
determine whether to perform a redaction on the audio communication based at least in part on the comparison and a determination that the intended recipient is not on the list of privileged recipients;
in response to determining that the redaction on the audio communication is to be performed and in response to finding at least one identified token that matches a classified token in the classified token database, select a portion of the audio communication corresponding to the at least one identified token to redact, wherein the audio communication is intended for multiple recipients, wherein the redaction is to be performed for the recipient that is not on the list of privileged recipients; and
output, to the security application, an indication of the selected portion of the audio communication to enable redaction of the selected portion by a remote user device of a sender of the audio communication,
wherein the indication also includes an option, to the sender of the audio communication, of whether to perform the redaction.

16. The computer program product of claim 15, wherein the natural language processing parses the audio communication into confidentiality levels.

17. The computer program product of claim 16, wherein the confidentiality levels correspond to at least some of the identified tokens in the audio communication, wherein the confidentiality levels correspond to at least one recipient.

18. A system, comprising:
a hardware processor; and
logic integrated with the processor, executable by the processor, or integrated with and executable by the processor, the logic being configured to:
receive an encrypted audio communication and identification of an intended recipient of the audio communication from a security application;
decrypt the encrypted audio communication;
identify tokens within the audio communication;
compare the identified tokens to classified tokens in a classified token database and determining whether any of the identified tokens match classified tokens in the classified token database, wherein the comparison includes using natural language processing to compare the identified tokens to the classified tokens in the classified token database;

receive, from the token database, a list of privileged recipients derived from a user access list of privileges and/or classifications associated with users;

determine whether the intended recipient is on the list of privileged recipients;

determine whether to perform a redaction on the audio communication based at least in part on the comparison and a determination that the intended recipient is not on the list of privileged recipients;

in response to determining that the redaction on the audio communication is to be performed and in response to finding at least one identified token that matches a classified token in the classified token database, select a portion of the audio communication corresponding to the at least one identified token to redact, wherein the audio communication is intended for multiple recipients, wherein the redaction is to be performed for the recipient that is not on the list of privileged recipients; and output, to the security application, an indication of the selected portion of the audio communication to enable redaction of the selected portion by a remote user device of a sender of the audio communication, wherein the indication also includes an option, to the sender of the audio communication, of whether to perform the redaction.

19. The system of claim 18, wherein the natural language processing parses the audio communication into confidentiality levels.

20. The system of claim 19, wherein the confidentiality levels correspond to at least some of the identified tokens in the audio communication, wherein the confidentiality levels correspond to at least one recipient.

\* \* \* \* \*